(12) United States Patent
Blasiak et al.

(10) Patent No.: US 6,904,601 B1
(45) Date of Patent: Jun. 7, 2005

(54) METHOD AND SYSTEM FOR PROVIDING REMOTE PROCEDURE CALLS IN A MULTIPROCESSING SYSTEM

(75) Inventors: Richard John Blasiak, Chapel Hill, NC (US); David Wayne Cosby, Raleigh, NC (US); Anthony Matteo Gallo, Apex, NC (US); Frank Andrew Smoak, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/545,689

(22) Filed: Apr. 7, 2000

(51) Int. Cl.[7] ............................................. G06F 9/46
(52) U.S. Cl. ................................. 719/330; 719/315
(58) Field of Search ............................... 719/315, 330; 709/330, 315

(56) References Cited

U.S. PATENT DOCUMENTS

| | | |
|---|---|---|
| 5,321,841 A | 6/1994 | East et al. |
| 5,465,351 A | 11/1995 | Lemmo |
| 5,475,819 A | 12/1995 | Miller et al. |
| 5,553,242 A | 9/1996 | Russell et al. |
| 5,617,570 A | 4/1997 | Russell et al. |
| 5,818,448 A | 10/1998 | Katiyar |
| 5,832,219 A | 11/1998 | Pettus |
| 6,108,715 A * | 8/2000 | Leach et al. ............... 709/330 |
| 6,567,837 B1 * | 5/2003 | Robinson ....................... 709/1 |

OTHER PUBLICATIONS

Curtis Yarvin, Richard Bukowski, and Thomas Anderson, "Anonymous RPC: Low–Latency Protection in a 64–Bit Address Space," 1993.*

IBM Technical Disclosure Bulletin, vol. 40, No. 12, Dec. 1997, Support of Distributed Computing Environment Remote Procedure Call Protocol in Customer Information Control System Client for Windows NT, p. 65–72.

* cited by examiner

Primary Examiner—Meng-Al T. An
Assistant Examiner—Li Zhen
(74) Attorney, Agent, or Firm—Sawyer Law Group LLP

(57) ABSTRACT

A method and system for providing remote procedure calls in a multiprocessing system is disclosed. The multiprocessing system includes a general purpose processor and a plurality of network processors. Each of the plurality of network processors includes a memory. The method and system comprises accessing a reserved address in at least one of the network processors and initiating a software action by a first portion of the reserved address. The method and system further includes pointing to an address within the memory of the at least one network processor to be processed based upon data in a second portion of the reserved address, wherein the data at the address is processed. A system and method in accordance with the present invention provides an indirect software jump in a microprocessing system through providing a reserved address in memory of each of the reserved address includes two portions. A first portion of the address triggers the software event requested by the general purpose processor (for example) and a second portion of the reserved address is utilized to process the data that was loaded at that address in the processor. The indirect software jump allows a general purpose processor to execute software on a network processor indirectly for custom application services or debug operations.

10 Claims, 6 Drawing Sheets

| index 0 | address 0 |
| --- | --- |
| index 1 | address 1 |
| index 2 | address 2 |
| index 3 | address 3 |
| index 4 | address 4 |
| index 5 | address 5 |
| index n | address n |

METHOD AND SYSTEM FOR PROVIDING REMOTE PROCEDURE CALLS IN A MULTIPROCESSING SYSTEM

FIELD OF THE INVENTION

The present invention relates to multiprocessing systems and more particularly to a method and system for providing remote procedure calls in such systems.

BACKGROUND OF THE INVENTION

The multiprocessor, parallel execution model used in a general network processor design demands an effective, simple implementation of remote procedure calls. Remote calls may be made from a general purpose processor to a network processor pico-engine, or generically, between any processors within the system. The execution of remote procedure calls enables flexible optimized distribution of both function and workload among multiple processors. Two methods are currently utilized to provide this optimized distribution.

One solution is to pass the entire instruction address within the control message. This successfully effects the remote procedure call, but how does the originator of the message know the instruction address of the call? If the processors use independent code loads, what if the entry point for the remote procedure call execution changes from code load to code load? Some external processing is required to analyze code images to verify/determine entry points and assist in resolving entry point to address at remote procedure call issue time.

An alternative solution is to create a jump table for the processor executing the remote procedure call. A remote procedure call is requested by issuing a request with the appropriate index into the jump table. Thus, the only consistency required between remote procedure call network processor requester and remote procedure call network processor receiver is that the table index remain consistent in both processes. This approach works well, but suffers from requiring a pre-allocated jump table. In the multiprocessor environment memory storage is at a premium. Thus it is desirable to minimize the amount of dedicated storage in the memory.

Accordingly, what is needed is a system and method which overcomes the above-identified problem. The present invention addresses such a need.

SUMMARY OF THE INVENTION

A method and system for providing remote procedure calls in a multiprocessing system is disclosed. The multiprocessing system includes a general purpose processor and a plurality of network processors. Each of the plurality of network processors includes a memory. The method and system comprises accessing a reserved address in at least one of the network processors and initiating a software action by a first portion of the reserved address. The method and system further includes pointing to an address within the memory of the at least one network processor to be processed based upon data in a second portion of the reserved address, wherein the data at the address is processed.

A system and method in accordance with the present invention provides an indirect software jump in a microprocessing system through providing a reserved address in memory of each of the reserved address includes two portions. A first portion of the address triggers the software event requested by the general purpose processor (for example) and a second portion of the reserved address is utilized to process the data that was loaded at that address in the processor. The indirect software jump allows a general purpose processor to execute software on a network processor indirectly for custom application services or debug operations.

BRIEF DESCRIPTION OF THE DRAWINGS

FIG. 4 is a block diagram illustrating a jump table.

DETAILED DESCRIPTION

The present invention relates to multiprocessing systems and more particularly to a method and system for providing remote procedure calls in such systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
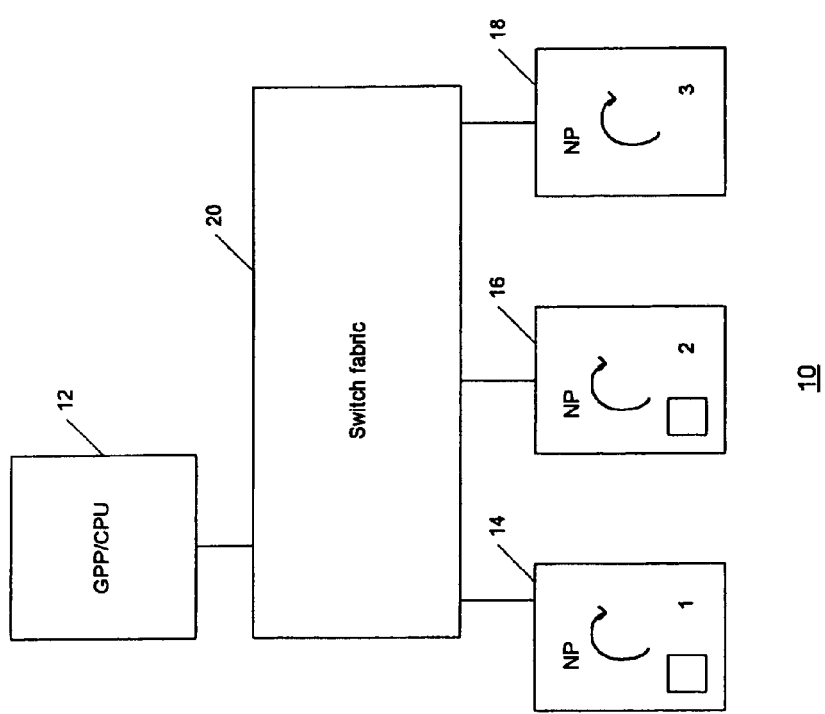
FIG. 1 illustrates a conventional multiprocessing system.

FIG. 1 illustrates a conventional multiprocessing system 10. The conventional multiprocessing system 10 includes a general purpose processor 12 which includes an instruction set The general purpose processor 12 controls a plurality of network processors 14, 16 and 18 via a switch fabric 20. Each of the network processors 14 through 18 are independent central processing units. The network processors 14, 16, 18 are special processors that provide protocol forwarding and are highly tuned for network programming. The switch fabric 20 allows for combinations of processors 12–18 to communicate with each other.

Figure 2:
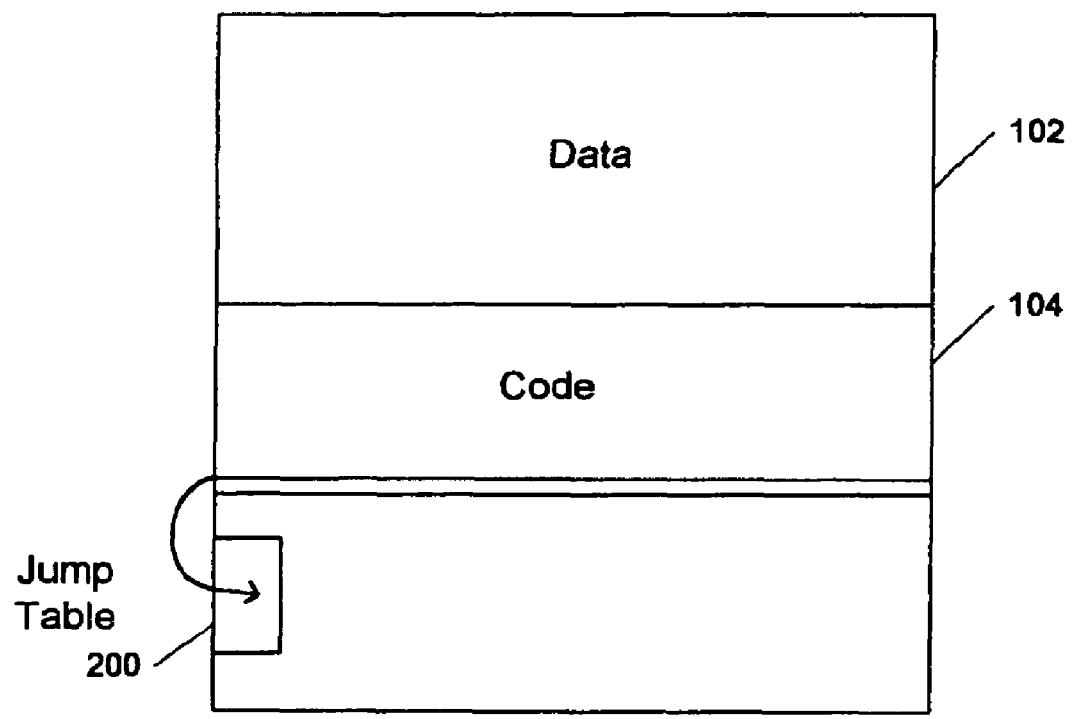
FIG. 2 illustrates such a memory architecture.

In each of the processors 12–18, there is dedicated memory which holds data and code. FIG. 2 illustrates such a memory architecture 100. As is seen data 102 comprises upper portion of the memory structure and code 104 for executing the data occupies the lower portion. The network processors 14–18 (FIG. 1) could be the same version of a processor (such x86, Apple, Pentium or RISC or other processor architecture). However, it is more likely that the network processors are different versions of a particular processor family. Accordingly, the memory architecture may be different for each processor so a software operation that is called by one processor to be preformed b other processors may have to be initiated from a different part of the memory architecture from processor to processor. In addition, memory is a very precious resource, particularly for the network processors. The network processors are highly tuned for protocol handling and therefore do not have a large amount of memory to dedicate to a particular function. As the number of network processors grow, the number of commands that can be sent to a processor increases.

The multiprocessor, parallel execution model used in a network processor design demands an effective, simple implementation of remote procedure calls. Remote calls may be made from the general purpose processor 12 to one or more network processor 14–18, or generically, between any of the processors 12–18 within the system 10. The execution of remote procedure calls enables flexible optimized distribution of both function and workload among multiple processors. To provide for this flexibility, one of two conventional systems are utilized.

In a first system, the entire instruction address is passed within a control message. This successfully provides for the remote procedure call, but the originator of the message does not know the instruction address of the call. When the processors use different independent code loads, sometimes the entry point for the remote procedure call execution changes from code load on one processor to a different code load on a second processor. Some external processing is required to analyze code images to verify/determine entry points and assist in resolving entry point to address at remote procedure call issue time for each of the processor.

Figure 3:
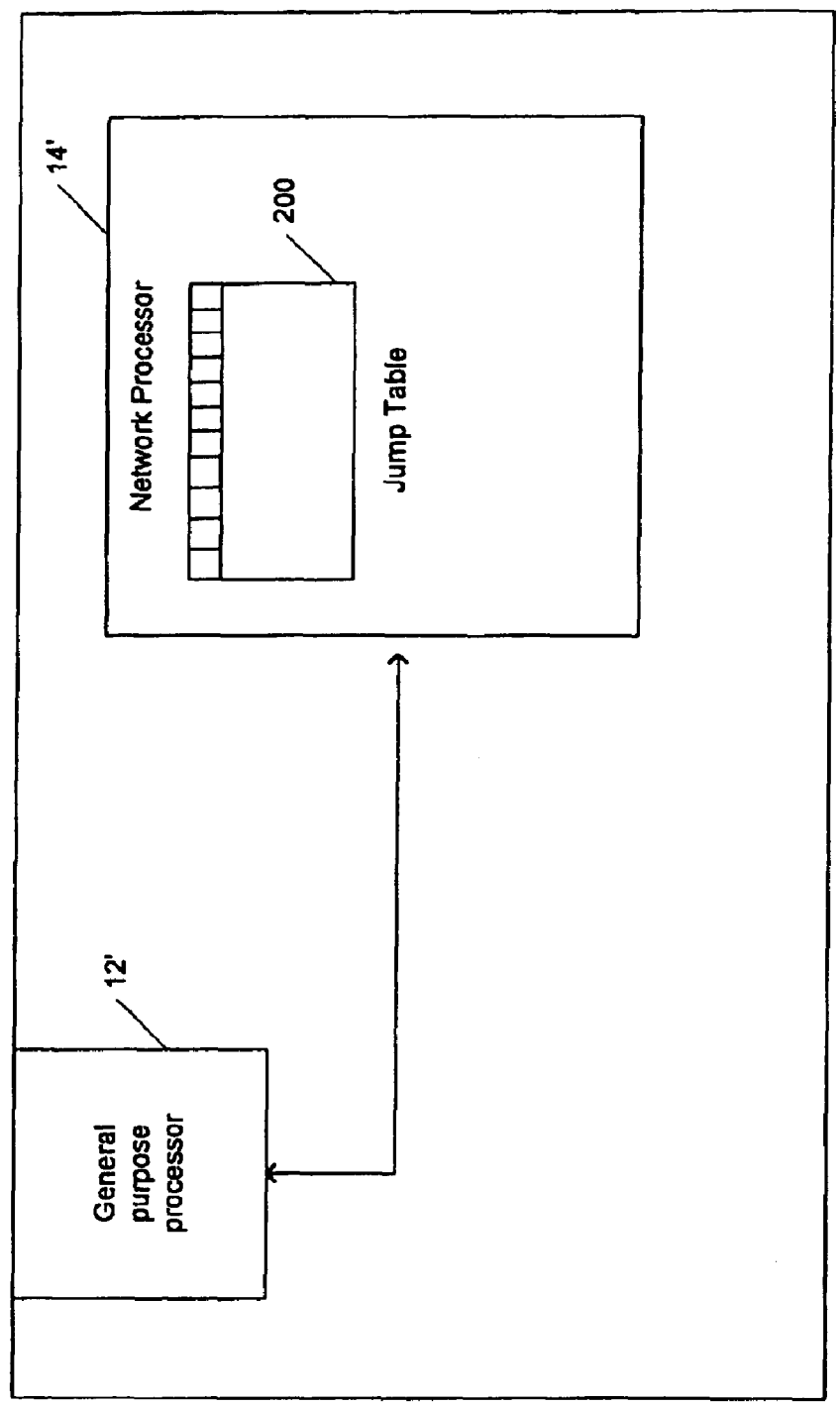
FIG. 3 illustrates the use of a jump table resource on the network processor

An alternative system is to create a jump table for the processor executing the remote procedure call. FIG. 3 illustrates the use of a jump table resource on a network processor 14'. A remote procedure call is requested by issuing a request with the appropriate index into the jump table 200 via the general purpose processor 12'. Thus, the only consistency required between the remote procedure call requester and remote procedure call processor is that the table index remain consistent in both processors. This approach works well, but suffers from requiring a pre-allocated jump table 200.

To explain the problem with a pre-allocated jump table 200, refer now to the following discussion in conjunction with the accompanying figures. FIG. 4 is a block diagram illustrating a jump table 200. The jump table 200 includes a plurality of entries which each of which includes an offset and an address. The jump table 200 must be accessed by a control message from a processor that indicates a software action. Next the processor must load a base address and add that to the staring address. Thereafter, the software executes from this new address. Accordingly contiguous memory blocks must be allocated in the memory for the jump table and there is always some of the table that is not used and therefore can be utilized for no other purpose.

Accordingly, a significant amount of reserved storage for either maintaining a pre-allocated jump table or a large amount of external processing is required to analyze code images to determine what the starting instruction address is for the software action adding to the latecy of the system.

In a system and method in accordance with the present invention an indirect software jump is provided through reserving an address in memory where the address includes two portions. A first portion triggers the software event and a second portion of the address is utilized to process the data that was loaded into a register in the processor. An indirect software jump allows a general purpose processor to execute software on a network processor indirectly for custom application services or debug. An example of such a service is performing a custom table insert which inserts a forwarding entry and automatically inserts a pointer to a global counter block specific to that network processor.

Figure 5:
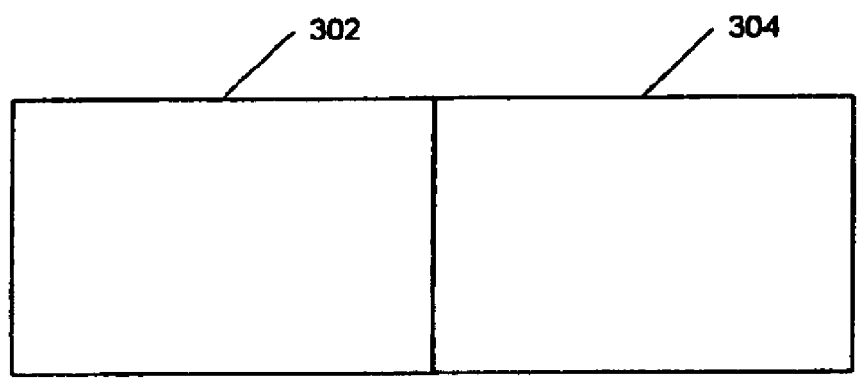
FIG. 5 is a diagram of a reserved address within a network processor utilized to provide the indirect software jump.

To describe the present invention in more detail, refer now to the following discussion in conjunction with the accompanying figures. FIG. 5 is a diagram of a reserved address 300 within a network processor utilized to provide the indirect software jump. The reserved address 300 is typically a four to eight byte value dependent upon the length of the instruction. The address includes a first portion 302 for triggering the software action and a second portion 304 for pointing to the address of memory that is to be processed. Each of the reserved addresses 300 within a processor are located in a known area (preferably in the same location for each memory).

Figure 6:
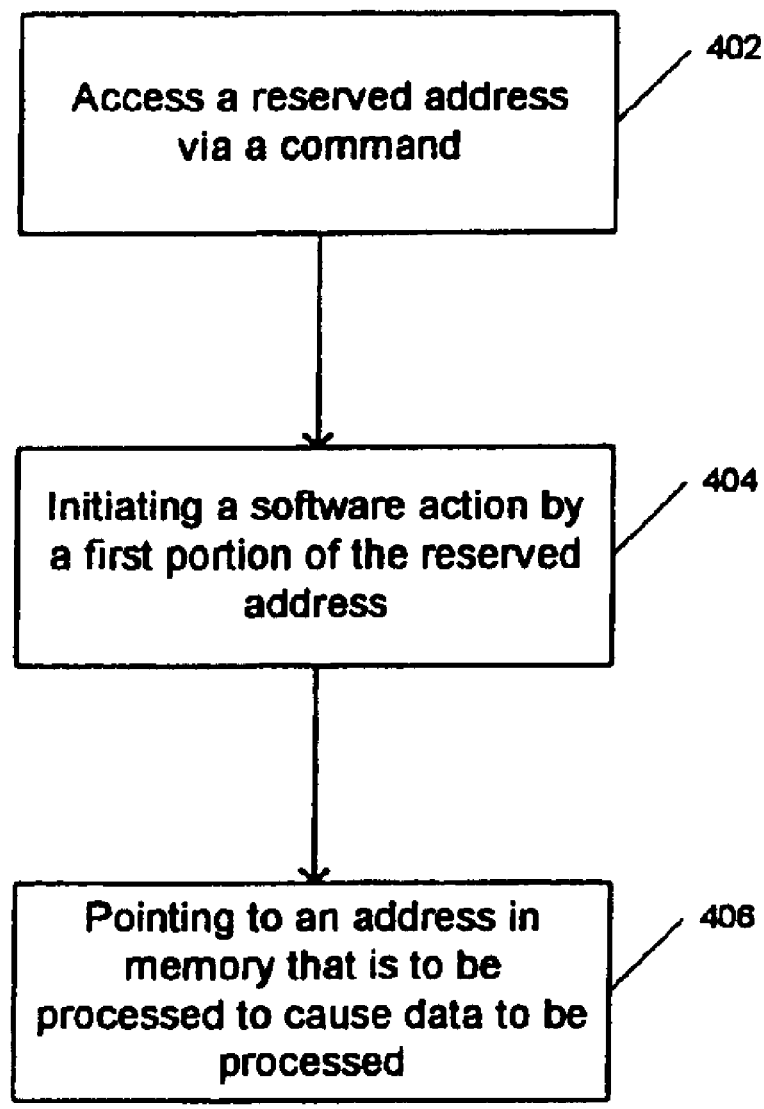
FIG. 6 is a flow chart for providing an indirect software jump in a multi-processing system.

FIG. 6 is a flow chart for providing an indirect software jump in a multi-processing system. First, a reserved address is accessed by a command, via step 402. Next, a software action is initiated by a first portion of the reserved address, via step 404. Then, the second portion of the address points to an address that is to be processed within the memory, and wherein the data at that address is processed, via step 406.

By utilizing an indirect software jump, the remote procedure call executor can dereference the requested operation within the scope of its own load module. External processing is not required to resolve entry points. A preallocated jump table is not precluded, but is not required. Since the full address of the remote procedure call (or function) pointer is provided in the place of an index, the pointers can be arranged in a tabular form or anchored individually throughout the memory space. The only requirement is that the address of the function pointer, or remote procedure call pointer, remain constant between remote procedure call caller and processor. Therefore, allocation of memory is minimized and contiguous memory to execute an indirect software jump is also not required.

Conclusion

A system and method in accordance with the present invention provides an indirect software jump in a microprocessing system through providing a reserved address in memory of each of the reserved address includes two portions. A first portion of the address triggers the software event requested by the general purpose processor (for example) and a second portion of the reserved address is utilized to process the data that was loaded at that address in the processor. The indirect software jump allows a general purpose processor to execute software on a network processor indirectly for custom application services or debug operations.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing remote procedure calls in a multiprocessing system, the multiprocessing system including a general purpose processor and a plurality of network processors; each of the plurality of network processors having a memory, the method comprising the steps of:

(a) accessing a reserved address in the memory of at least one of the plurality of network processors, wherein the reserved address comprises a first portion and a second portion, wherein the reserved address is known to a remote procedure call requestor, wherein the second portion comprises a pointer for an instruction address of a procedure code, wherein the instruction address is not known to the remote procedure call requester;

(b) initiating a software action by the first portion of the reserved address, wherein the software action comprises obtaining the pointer in the second portion of the reserved address; and (c) accessing and processing the procedure code at the instruction address utilizing the pointer, wherein the reserved address eliminates a need for a jump table to provide the instruction address.

2. The method of claim 1 wherein the reserved address comprises one instruction.

3. The method of claim 1 wherein each of the network processors include a reserved address.

4. The method of claim 1 wherein a location of the reserved address of each network processor is known by the other processors.

5. The method of claim 4 wherein the reserved addresses of each network processor is in the same location of memory.

6. A system for providing remote procedure calls in a multiprocessing system, the multiprocessing system including a general purpose processor and a plurality of network processors; each of the plurality of network processors having a memory, the system comprising:

means for accessing a reserved address in the memory of at least one of the plurality of network processors, wherein the reserved address comprises a first portion and a second portion, wherein the reserved address is known to a remote procedure call requestor, wherein the second portion comprises a pointer for an instruction address of a procedure code, wherein the instruction address is not known to the remote procedure call requester;

means for initiating a software action by the first portion of the reserved address, wherein the software action comprises obtaining the pointer in the second portion of the reserved address; and means for accessing and processing the procedure code at the instruction address utilizing the pointer, wherein the reserved address eliminates a need for a jump table to provide the instruction address.

7. The system of claim 6 wherein the reserved address comprises one instruction.

8. The system of claim 6 wherein each of the network processors include a reserved address.

9. The system of claim 6 wherein a location of the reserved address of each network processor is known by the other processors.

10. The system of claim 9 wherein the reserved addresses of each network processor is in the same location of memory.

* * * * *

UNITED STATES PATENT AND TRADEMARK OFFICE
CERTIFICATE OF CORRECTION

PATENT NO. : 6,904,601 B1  Page 1 of 1
APPLICATION NO. : 09/545689
DATED : June 7, 2005
INVENTOR(S) : Blasiak et al.

It is certified that error appears in the above-identified patent and that said Letters Patent is hereby corrected as shown below:

In column 4, line 62, replace "requester", add --requestor --
In column 6, line 3, replace "requester", add --requestor --

Signed and Sealed this

Fifteenth Day of August, 2006

JON W. DUDAS
*Director of the United States Patent and Trademark Office*